(12) United States Patent
Kobayashi (10) Patent No.: US 7,068,573 B2
(45) Date of Patent: Jun. 27, 2006

(54) REPRODUCING DEVICE AND METHOD OF REMOVING NOISE

(75) Inventor: Seiji Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 644 days.

(21) Appl. No.: 10/305,198

(22) Filed: Nov. 27, 2002

(65) Prior Publication Data

US 2003/0123360 A1    Jul. 3, 2003

(30) Foreign Application Priority Data

Nov. 30, 2001   (JP) .............................. 2001-366205

(51) Int. Cl.
   *G11B 7/00*   (2006.01)

(52) U.S. Cl. ................. 369/47.17; 369/59.22

(58) Field of Classification Search .............. 369/47.17
See application file for complete search history.

(56) References Cited

U.S. PATENT DOCUMENTS

| | | | |
|---|---|---|---|
| 6,307,823 B1 * | 10/2001 | Kobayashi | 369/47.19 |
| 6,370,092 B1 * | 4/2002 | Araki et al. | 369/44.23 |
| 6,442,114 B1 * | 8/2002 | Ishibashi et al. | 369/47.17 |
| 6,614,745 B1 * | 9/2003 | Takeda et al. | 369/124.13 |
| 6,661,761 B1 * | 12/2003 | Hayami et al. | 369/59.21 |
| 6,836,456 B1 * | 12/2004 | Tonami | 369/59.22 |

* cited by examiner

*Primary Examiner*—Gautam R. Patel
(74) *Attorney, Agent, or Firm*—Oblon, Spivak, McClelland, Maier & Neustadt, P.C.

(57) ABSTRACT

For reproducing data, a first read signal from a main track is filtered and second read signals from tracks adjacent to the main track are filtered. A cross-modulation component included in a third read signal from the main track is removed by calculating an estimated value of cross-modulation for the main track by multiplying the filtered first read signal by the filtered second read signals and by subtracting the estimated value from the third read signal. A crosstalk component caused by the adjacent tracks included in a fourth read signal from the main track is removed by obtaining the crosstalk component by filtering the second read signals and by subtracting the crosstalk component from the fourth read signal.

5 Claims, 6 Drawing Sheets

REPRODUCING DEVICE AND METHOD OF REMOVING NOISE

BACKGROUND OF THE INVENTION

1. Field of the Invention

The present invention relates to a reproducing device for reproducing information stored in a recording medium such as an optical disk. The present invention further relates to a method of removing noise. Particularly, the present invention relates to a technology for canceling noise such as cross-modulation due to the adjacent track and crosstalk generated by the cross modulation.

2. Description of the Related Art

When an optical disk is used as a recording medium, high-density recording is achieved by decreasing the width of the track pitch of the optical disk.

However, in the case where the width of the track pitch is decreased, the width should be equal to or less than the diameter of a laser-light spot focused on the optical disk. That is to say, if the width of the track pitch is decreased without changing the diameter of the laser-light spot, signals of tracks adjacent to a main track would be reproduced together with signals of the main track. Therefore, the cross-modulation and the crosstalk are increased, thus deteriorating the S/N ratio, whereby recorded signals are incorrectly reproduced.

Here, "main track" as used herein means a track of a recording medium, such as a disk, that is currently being traced, that is, the track being irradiated with laser light by an optical pickup. "Adjacent tracks" as used herein means a track adjacent to the main track at the inner radius thereof and a track adjacent to the main track at the outer radius thereof.

In the past, crosstalk and cross-modulation have been reduced as described below.

An example where a reproducing device has an optical pickup that uses three light-beams including a main beam and two sub beams for reading signals is considered. In such a case, tracking control is performed so that the main track is irradiated with the main beam. Subsequently, reflection light is obtained and a signal corresponding to the main track is read out by using the reflection light. Further, the adjacent tracks are irradiated with the two sub beams. Then, based on outputs from reflection light obtained by the two sub beams, the values of crosstalk signals are estimated. By subtracting the estimated values of the crosstalk signals from the read main-track signal, crosstalk is cancelled. Thus, the crosstalk from the adjacent tracks, which disturbs the main-track signal to be reproduced, is decreased (corrected).

Figure 5:
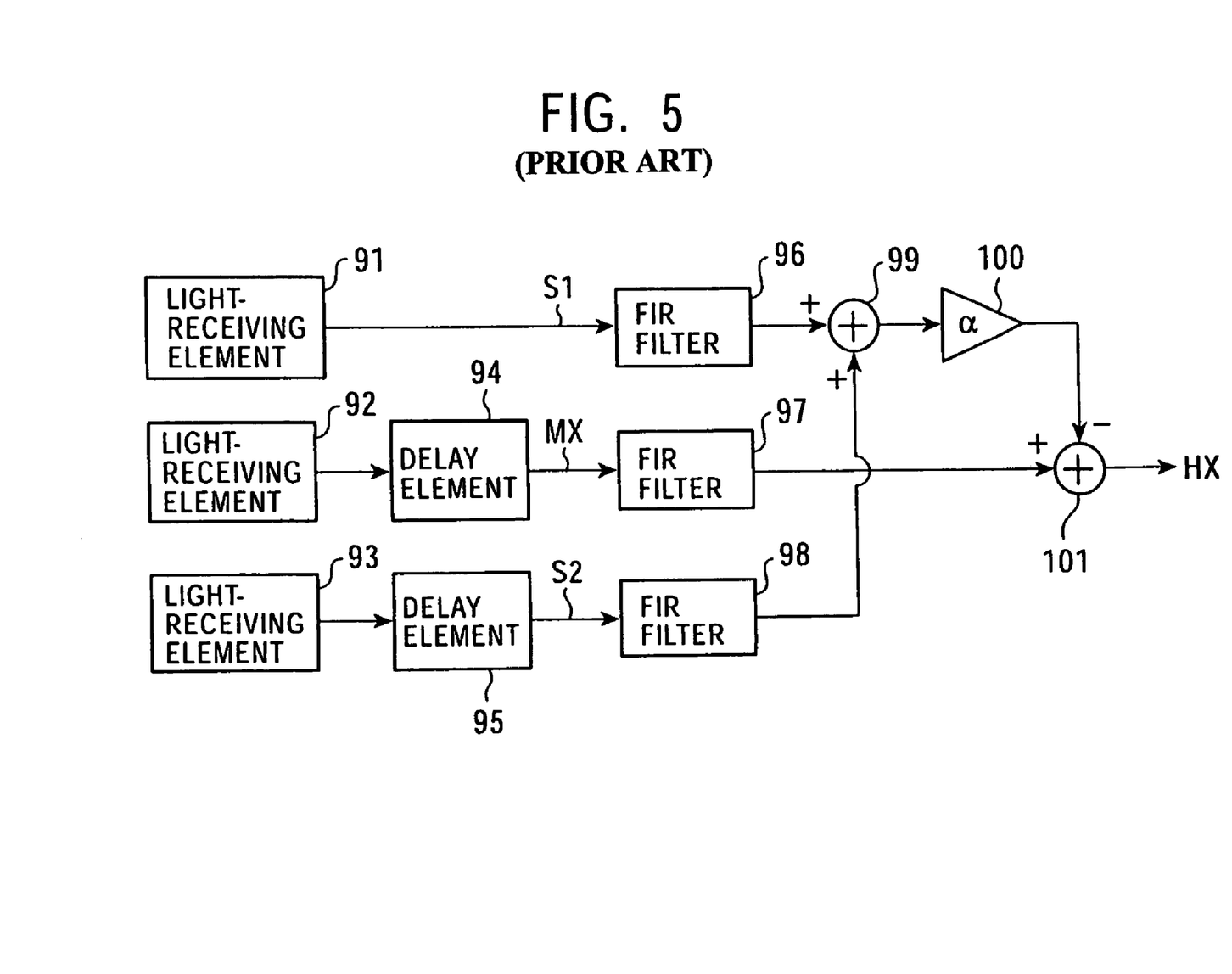
FIG. 5 is a block diagram illustrating the configuration of a typical known crosstalk-correction circuit.

FIG. 5 is a block diagram illustrating a typical crosstalk-correction circuit that can be used for the above-described reproducing device.

It should be noted that a pickup including an optical system (not shown) irradiates an optical disk (not shown) with the main beam and the two sub beams.

The main track is irradiated with the main beam. The adjacent tracks on both sides of the main track are irradiated with the two sub beams.

Returned light obtained from the main beam is converted into an electrical signal by a light-receiving element 92. Subsequently, a main signal MX, which is a light-intensity signal corresponding to the main track, is obtained.

Returned light obtained from the sub beams is converted into two electrical signals by light-receiving elements 91 and 93. Subsequently, side signals S1 and S2, which are light-intensity signals corresponding to the adjacent tracks, are obtained.

By using the information about the adjacent tracks obtained by the light-receiving elements 91 and 93, the crosstalk from the adjacent tracks is corrected.

In the above-described case, the time difference between the three light beams, that is, the time difference between the side signal S1, the main signal MX, and the side signal S2, is corrected.

Then, the signals S1, MX, and S2 are each provided with a predetermined frequency characteristic by FIR filters 96, 97, and 98, respectively.

Next, the side signal S1 is added to the side signal S2 by an adder 99. That is to say, interference components from the two adjacent tracks are added together. Therefore, the signal output from the adder 99 becomes nearly equal to the crosstalk components from the two adjacent tracks.

Then, a multiplier 100 multiplies the signal output from the adder 99 by a predetermined constant $\alpha$. Next, a subtractor 101 subtracts the multiplied result from the main signal MX. That is to say, the subtractor 101 cancels the crosstalk generated by the two adjacent tracks from the signal. Afterwards, the subtractor 101 outputs a corrected signal HX to be reproduced.

If a signal recorded on the main track is indicated by m(x) and signals recorded on the two adjacent tracks are indicated by s1(x) and s2(x), the above-described operations performed by the crosstalk-correction circuit shown in FIG. 5 can be indicated by Equation (1) shown below.

$$H(x)=m(x)*psf1(x)-\alpha\{s1(x)+s2(x)\}*psf2(x). \quad (1)$$

In Equation (1), the * symbol indicates convolution, $\alpha$ indicates the predetermined constant $\alpha$ to be multiplied by the signal output from the adder 99 by the multiplier 100, psf1(x) corresponds to the impulse response of the FIR filter 97, and psf2(x) corresponds to the impulse responses of the FIR filters 96 and 98.

Many crosstalk-correction circuits having the above-described configuration have already been proposed. Such crosstalk-correction circuits are disclosed in, for example, Japanese Unexamined Patent Application Publication No. 2001-167442, U.S. Pat. No. 6,442,114, U.S. Pat. No. 5,909,413, U.S. Pat. No. 5,729,514, and U.S. Pat. No. 5,544,141. Though the details of these crosstalk-correction circuits are different from that shown in FIG. 5, they all have substantially the same configuration as that of the crosstalk-correction circuit shown in FIG. 5. Further, the operations performed by these crosstalk-correction circuits are nearly equal to that shown by Equation (1).

However, in the cases where these crosstalk-correction circuits are used, the crosstalk effect changes according to the state of the main track. That is to say, the crosstalk effect changes according to whether or not there is a pit or a mark on the main track at the position where the laser-beam tracing is being performed. (If there is no pit nor mark on the main track at the above-described position, the surface at that position is called a mirror surface.) Therefore, the amount of cancelled crosstalk may become too large or too small, depending on the main-track state. That is to say, it is not possible to properly perform crosstalk canceling by using the above-described crosstalk-correction circuits.

The above-described problem will be described with reference to FIG. 6. When the spot of the main beam scanning the main track is positioned on an area A where the main track and the two adjacent tracks are all mirror surfaces M, the returning light intensity of the main beam is at Level LV1, which is the highest level. However, when the spot of the main beam is positioned on an area B where the main track is a mirror surface M, the adjacent track at the inner radius of the main track has a pit P, and the adjacent track at the outer radius of the main track is a mirror surface M, the returning light intensity of the main beam is at Level LV2, which is lower than the Level LV1, due to the effect of crosstalk generated by the pit of the adjacent track at the inner radius of the main track.

When the spot of the main beam is positioned on an area C where the main track is a mirror surface M, the adjacent track at the inner radius of the main track has a pit P, and the adjacent track at the outer radius of the main track has another pit P, the returning light intensity of the main beam is at level LV3, which is lower than the level LV2, due to the effect of crosstalk generated by the pits of the adjacent tracks at the inner radius and at the outer radius of the main track.

Thus, when the area of the main track irradiated with the main beam is a mirror surface M, the returning light intensity of the main beam is sharply decreased due to the effect of the pit P of the adjacent track as in the case of the area B. Particularly, in the case of the area C where each of the adjacent tracks at the inner radius and at the outer radius of the main track has the pit P, the returning light intensity is half as much as that of the case where there is no effect from the adjacent tracks, as in the case of the area A.

Figure 6:
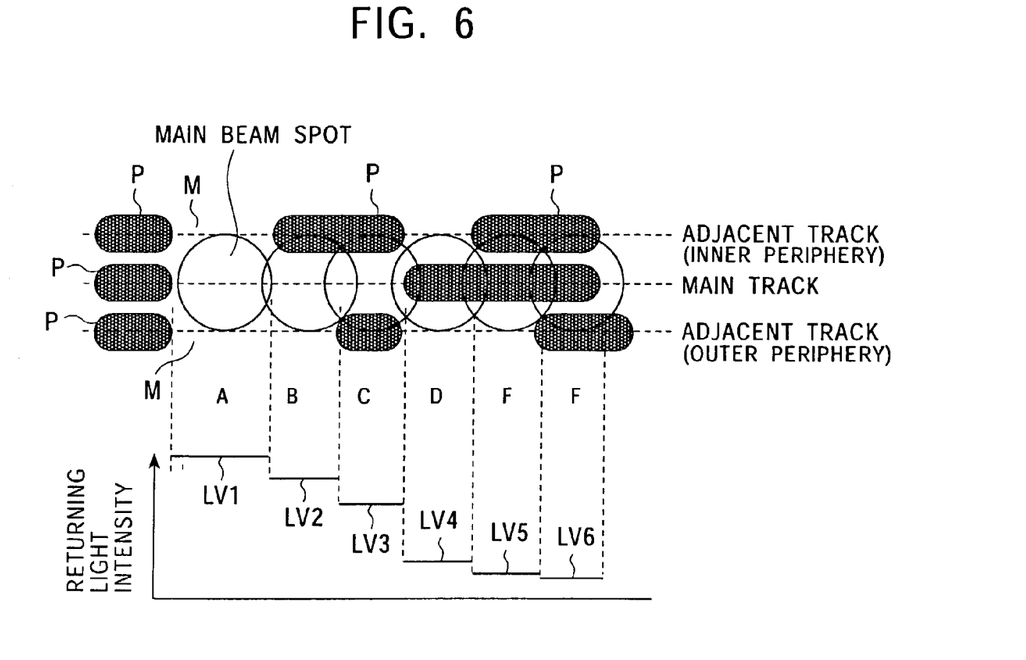
FIG. 6 illustrates the returning light intensity of a main beam, which changes according to how a main track and adjacent tracks on both sides of the main track are irradiated by the main beam.

As shown in FIG. 6, when the spot of the main beam is positioned on an area D where the main track has a pit P and the adjacent tracks at the inner radius and at the outer radius of the main track are mirror surfaces M, the returning light intensity of the main beam is at level LV4. When the spot of the main beam is positioned on an area E where the main track has a pit P, the adjacent track at the inner radius of the main track has another pit P, and the adjacent track at the outer radius of the main track is a mirror M, the returning light intensity of the main beam is at level LV5, which is slightly lower than the level LV4, due to the effect of crosstalk generated by the pit P of the adjacent track at the inner radius of the main track. When the spot of the main beam is positioned on an area F where the main track has a pit P and each of the adjacent tracks at the inner radius and at the outer radius of the main track has another pit P, the returning light intensity of the main beam is at level LV6, which is slightly lower than the level LV5, due to the effect of crosstalk generated by the pits P of the adjacent tracks at the inner radius and at the outer radius of the main track.

Therefore, when the main track has a pit P at the position being irradiated with the main beam, as in the cases of the areas D, E, and F, the returning light intensity of the main beam is affected by the pit Ps on the adjacent tracks. However, the strength of the effect of the pit P from the adjacent track is smaller than in the cases of the areas A, B, and C where the main track is the mirror surface M.

Thus, the effect of the adjacent track is increased when the mirror surface of the main track is scanned. However, the effect of the adjacent track is decreased when the pit P of the main track is scanned. That is to say, the strength of the adjacent-track effect on the returning light intensity of the main beam changes depending on whether or not the main track has the pit P at the position that is being scanned by the main beam.

For solving the above-described problem, U.S. Pat. No. 6,084,837 discloses an apparatus for reproducing information recorded on a recording medium. The apparatus comprises a signal reader for outputting signals read from a main track and a track adjacent to the main track, a variable filter for filtering the signal read from the adjacent track and converting the signal into a crosstalk signal of the main track, a subtractor for subtracting the crosstalk signal from the signal read from the main track and a crosstalk-signal corrector for correcting the level of the crosstalk signal based on the signal read from the main track.

In the case where the above-described apparatus is used, the level of the crosstalk signal is decreased when the main track has a pit. However, the level of the crosstalk signal is increased when the main track is a mirror surface. In this manner, it becomes possible to properly adjust the amount of cancelled crosstalk for properly performing crosstalk canceling.

If a signal recorded on the main track is indicated by m(x) and signals recorded on two tracks adjacent to the main track are indicated by s1(x) and s2(x), the above-described operations performed by the crosstalk-signal corrector disclosed in U.S. Pat. No. 6,084,837 can be indicated by Equation (2) shown below, wherein $\alpha$ and $\beta$ are constants:

$$H(x)=m(x)*psf1(x)-\{1+\beta \cdot m(x)*psf1(x)\} \cdot \{1+\alpha \cdot \{s1(x)+s2(x)\}*psf2(x)\}. \quad (2)$$

A comparison of the above-described Equation (1) and Equation (2) is given below.

According to Equation (1), the information of the adjacent tracks is simply subtracted from the information of the main track. However, in Equation (2), the main-track information is multiplied by the adjacent track information. Such a component obtained by the above-described multiplication is generally referred to as cross-modulation.

If a signal recorded on the main track is indicated by m(x) and signals recorded on the two adjacent tracks are indicated by s1(x) and s2(x), the reproducing signal H(x), which is detected by an optical pickup, should be described as in the following equation:

$$H(x)=m(x)*psf1(x)+\alpha \cdot \{s1(x)+s2(x)\}*psf2(x)+\beta \cdot \{s1(x)*psf3(x)\}\{m(x)*psf4(x)\}+\beta \cdot \{s2(x)*psf3(x)\}\{m(x)*psf4(x)\}. \quad (3)$$

In Equation (3), psf1(x), psf2(x), psf3(x), and psf4(x) are impulse responses, which differ from one another. Further, in this equation, the third and fourth terms (terms multiplied by constant $\beta$) indicate the effect of the cross-modulation.

Thus, in the case where an optical disk is used, two kinds of effect are caused by the adjacent tracks, namely, crosstalk components indicated by the term multiplied by constant $\alpha$ and cross-modulation components indicated by the terms multiplied by constant $\beta$. The frequency characteristic of the crosstalk components and that of the cross-modulation components are different from each other.

However, according to the related arts, the crosstalk generated by the adjacent tracks has been corrected or canceled by performing the approximate calculations shown in Equation (1) and Equation (2).

When the approximate calculation shown in Equation (1) is performed, the effect of the cross-modulation is ignored. Therefore, the noise cannot be properly corrected.

When the approximate calculation shown in Equation (2) is performed, the cross-modulation components shown in Equation (3) are not properly corrected.

Therefore, when the reproducing signal H(x), which is obtained according to the technique of related art, is decoded by maximum-likelihood decoding, an incorrect value may be obtained.

SUMMARY OF THE INVENTION

Accordingly, it is an object of the present invention to supply proper signals to a decoder circuit by performing the cross-modulation canceling as correctly as possible in addition to crosstalk canceling for reproducing information stored in an optical recording medium such as an optical disk. As a result, when maximum-likelihood decoding is performed by using corrected signals obtained by the above-described two kinds of canceling, it becomes possible to reproduce information with error tolerance higher than that in the cases of the related art.

A reproducing device according to an aspect of the present invention irradiates a track of a recording medium with laser light and reproduces data stored on the track by using the light reflected from the track. The reproducing device comprises a signal-reading unit for outputting at least one first read signal from at least one track adjacent to a main track and a second read signal from the main track for reproduction. The reproducing device further comprises a first filtering unit for filtering the first read signal from the adjacent track and a second filtering unit for filtering the second read signal from the main track. The reproducing device further comprises a multiplication unit for multiplying an output from the first filtering means by an output from the second filtering means. The reproducing device further comprises an estimated-value calculation unit for calculating an estimated value of cross-modulation on the main track by using an output from the multiplication means. The reproducing device further comprises a cross-modulation removal unit for removing a cross-modulation component caused by the adjacent track from the second read signal by subtracting the estimated cross-modulation value from the second read signal.

Preferably, the reproducing device further comprises a third filtering unit for filtering the first read signal, and a crosstalk-removal unit for removing a crosstalk component caused by the adjacent track from the second read signal by subtracting an output from the third filtering unit from the second read signal.

Preferably, the estimated-value calculation unit comprises a fourth filtering unit that performs a calculation for removing an RF component from the output from the multiplication unit and a constant-multiplication unit for multiplying the output from the fourth filtering unit by a constant corresponding to the magnitude of the cross modulation.

Preferably, the first filtering unit comprises a first FIR filter and a first binarizing unit for binarizing the first read signal, and the second filtering means comprises a second FIR filter and a second binarizing unit for binarizing the second read signal.

According to another aspect of the present invention, there is provided a method of removing noise caused by at least one track adjacent to a main track on a recording medium for reproducing data stored on the main track. According to the method, a first read signal from the adjacent track is filtered and a second read signal from the main track is filtered. Further, an estimated value of cross-modulation is calculated by multiplying the filtered first read signal by the filtered second read signal. Further, an estimated value of crosstalk caused by the adjacent track is calculated by filtering the first read signal. Further, the second read signal is corrected by using the estimated cross-modulation value and the estimated crosstalk value.

According to the above-described configuration, it becomes possible to properly cancel the crosstalk effect from the adjacent tracks and to obtain signals appropriately corrected for reproduction. That is to say, by using the reproducing device and the method of removing noise of the present invention, it becomes possible to properly correct the cross-modulation, which is shown in Equation (3), from the adjacent tracks.

After having corrected the signals from the adjacent tracks, the maximum-likelihood decoding is performed. Accordingly, it becomes possible to the information recorded on the recording medium with error tolerance higher than that in the cases of the related arts.

DESCRIPTION OF THE PREFERRED EMBODIMENTS

Preferred embodiments of the present invention will now be described with reference to the attached drawings. In the embodiments, a reproducing device of the present invention reproduces information stored in an optical disk such as, for example, a CD (a Compact Disc), a DVD (a Digital Versatile Disc), and so forth.

Figure 1:
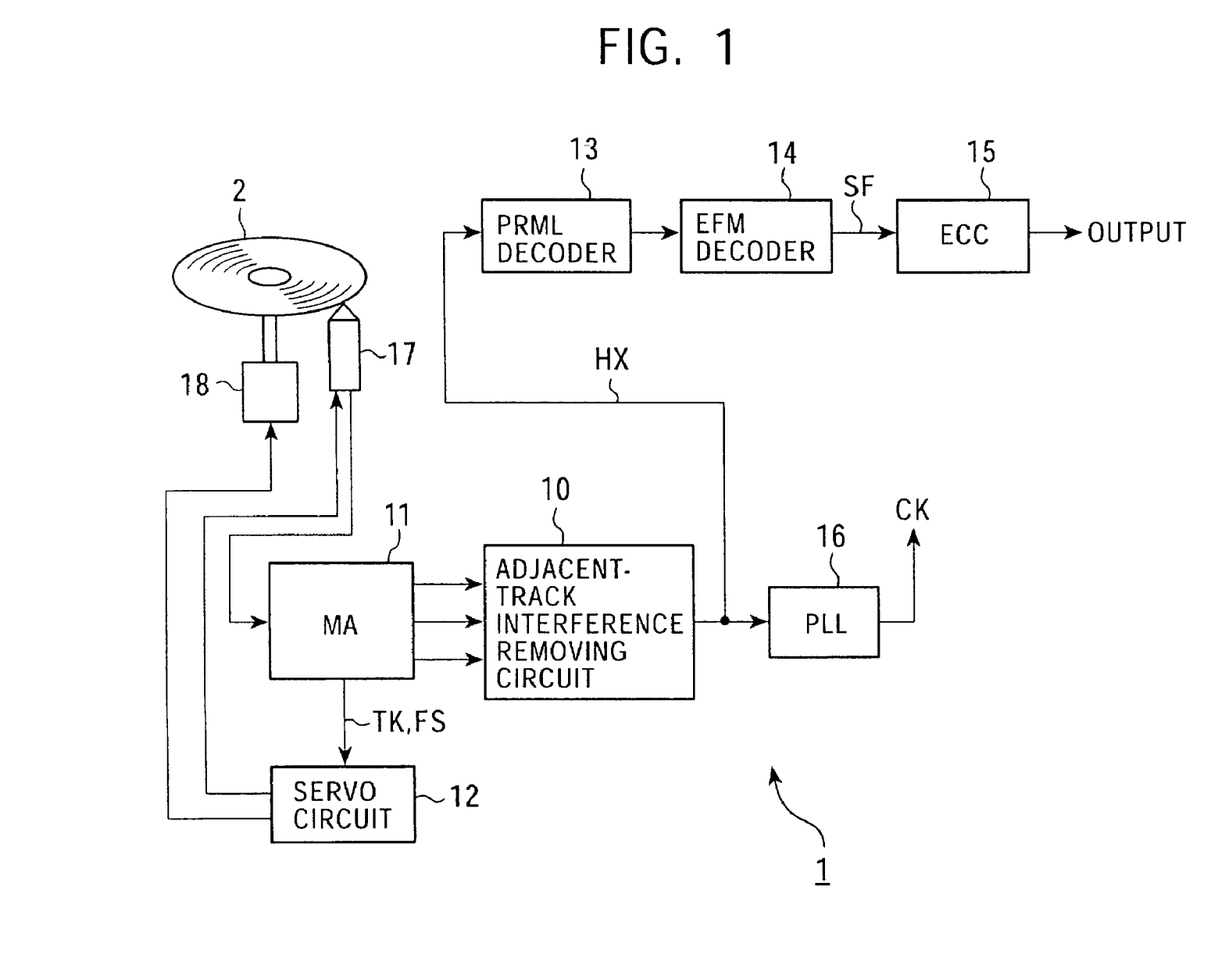
FIG. 1 is a block diagram illustrating the configuration of an optical-disk reproducing device according to an embodiment of the present invention.

FIG. 1 is a block diagram illustrating an optical-disk reproducing device 1 according to a first embodiment of the present invention. An optical disk 2, for example, a CD or a DVD, is mounted in the optical-disk reproducing device 1 and is rotated by a spindle motor 18.

The spindle motor 18 is controlled by a servo circuit 12 by a CLV method or a CAV method so that the spindle motor 18 is rotated at a predetermined speed.

The disk 2 rotated by the spindle motor 18 is irradiated with laser light by an optical pickup 17.

The optical pickup 17 includes a laser diode serving as a laser-output unit, an optical system including a diffraction grating, a collimating lens, a polarizing beam splitter, an objective lens, and so forth, and a plurality of detectors for detecting reflection light from the disk 2. The laser diode, the optical system, and the detectors are not shown in FIG. 1.

The objective lens included in the optical pickup 17 is held by a two-axis system so that the objective lens can move along the radial direction of the disk 2 and along the direction orthogonally towards and away from the disk 2. When the objective lens is moved by the two-axis system, focus servo and tracking servo are performed. The servo operations are controlled by a servo circuit 12.

Further, though not shown in FIG. 1, a sled system driven by a sled motor is provided in the optical-disk reproducing device 1. The sled system, which is driven by a sled motor, is controlled by the servo circuit 12 to move the optical pickup 17 along the radial direction of the disk 2.

The laser light output from the laser diode is split into three spots by a diffraction grating. The disk 2 is irradiated with the split laser light from the objective lens. Reflection light from the disk 2 goes back into the optical pickup 17. Part of the reflection light is guided to the plurality of detectors so as to be detected. The detected reflection light is output as electrical signals corresponding to the amount of received light from the detectors.

The electrical signals corresponding to the amount of received-light are input to a matrix-calculation circuit 11. The matrix-calculation circuit 11 is formed of an operational amplifier or the like. The matrix-calculation circuit 11 performs calculation by using the electrical signals output from the detectors to obtain signals such as tracking-error signals TK, focus-error signals FS, and so forth.

The matrix-calculation circuit 11 supplies three kinds of HF (High Frequency) signals detected from the three laser spots to an adjacent-track interference-removing circuit 10.

The adjacent-track interference-removing circuit 10 performs calculations for removing the crosstalk components and the cross-modulation components, which are generated by the adjacent tracks, from the HF signals. Then, the adjacent-track interference-removing circuit 10 supplies the HF signals to a PLL (Phase-Locked Loop) circuit 16 and a PRML decoding circuit 13 as corrected signals HX.

The tracking-error signals TK and the focus-error signals FS are transmitted to the servo circuit 12. The tracking-error signals TK and the focus-error signals FS are controlled by the servo circuit 12 so that the tracking servo and the focus servo are properly performed.

That is to say, the servo circuit 12 performs necessary processing such as phase-compensation processing, gain processing, and so forth for the input tracking-error signals TK and focus-error signals FS and sled-error signals generated as low-pass components of the tracking-error signals TK. Then, the servo circuit 12 generates various kinds of servo-control signals to control the operations performed by the two-axis system and the sled system.

The PLL circuit 16 reproduces a channel clock CK synchronized with a series of pits recorded on the disk 2 from the corrected signal HX. Then, the PLL circuit 16 transmits the channel clock CK to each circuit.

The PRML decoding circuit 13 is a maximum-likelihood decoding circuit using a Viterbi algorithm.

The PRML decoding circuit 13 performs pit determination and space determination for the corrected signal HX. Then, the PRML decoding circuit 13 obtains binary data and supplies the binary data to the EFM decoding circuit 14. The EFM decoding circuit 14 decodes the binary data based on the corrected signal HX and the channel clock CK from the PLL circuit 16 (demodulation for 8–14 modulation). Then, the EFM decoding circuit 14 supplies the decoded data to an ECC circuit 15 as an 8-bit-wide signal SF. The ECC circuit 15 corrects errors in the 8-bit-wide signal SF output from the EFM decoding circuit 14 based on an ECC (Error Correcting Code) that was added to the data when the data was encoded. Such errors are generated due to defects on the disk 2.

Subsequently, the ECC circuit 15 outputs a signal corresponding to the data originally recorded on the disk 2, that is, a signal corresponding to the data at recording time or disk-cutting time.

Therefore, for using the reproducing device 1 as a compact-disk player, a D/A converter, an amplifier, and a speaker are required By connecting the D/A converter, the amplifier, and the speaker to the output terminal of the ECC circuit 15, it becomes possible to reproduce sounds such as music from the speaker.

Figure 2:
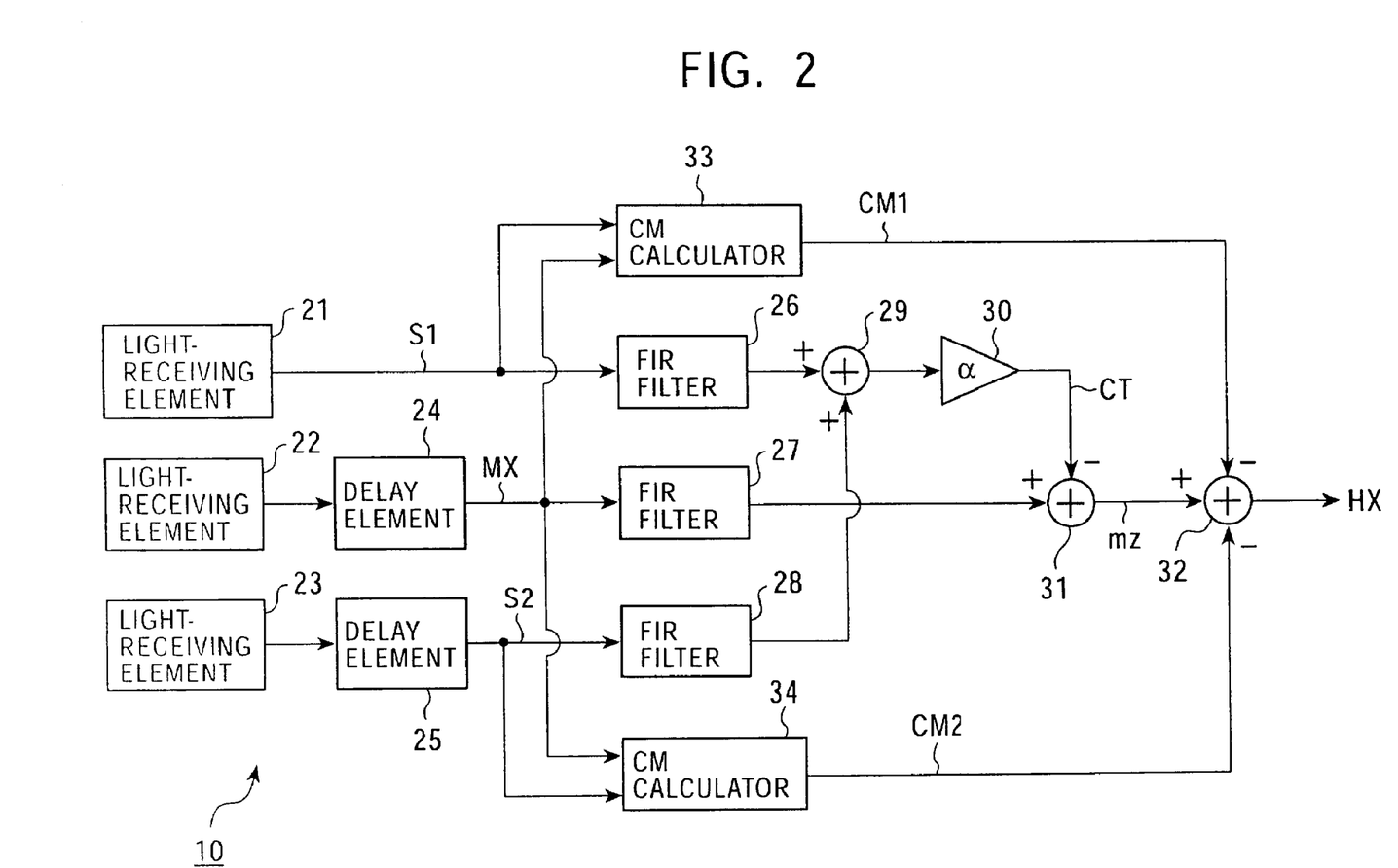
FIG. 2 is a block diagram illustrating the configuration of an adjacent-track interference-removing circuit according to the embodiment of the present invention.

FIG. 2 illustrates the configuration of the adjacent-track interference-removing circuit 10.

Light-receiving elements 21, 22, and 23 provided in the optical pickup 17 are detectors (optoelectronic transducers). The light-receiving elements 21, 22, and 23 receive reflection light from the three spots, namely, a main beam and two sub beams on both sides of the main beam, on the disk 2. Then, the light-receiving elements 21, 22, and 23 convert the received light into electrical signals.

The light-receiving element 22 is positioned so as to receive the reflection light from the spot of a main beam (a main spot) midway between the two sub-beam spots. Therefore, a signal output from the light-receiving element 22 includes the main-track data to be reproduced.

The light-receiving elements 21 and 23 are positioned so as to receive the reflection light from the spots of sub beams (side spots). Therefore, signals output from the light-receiving elements 21 and 23 include the data of the two adjacent tracks.

There is a time difference between the signals output from the light-receiving elements 22 and 23 due to the difference between the spot positions. For solving such a problem, delay elements 24 and 25 corresponding to the light-receiving elements 22 and 23 are provided. The delay elements 24 and 25 give proper time delays to the signals output from the light-receiving elements 22 and 23, respectively. (Hereinafter, the signal output from the delay element 24 is referred to as a main signal MX. Further, the signal output from the light-receiving element 21 is referred to as a side signal S1, and the signal output from the delay element 25 is referred to as a side signal S2.)

Accordingly, the time difference between the side signal S1, the main signal MX, and the side signal S2 is corrected.

FIR (Finite Impulse Response) filters 26, 27, 28 are each formed as a transversal filter. By performing convolution calculation by using predetermined impulse responses, the FIR filters 26, 27, and 28 give predetermined frequency characteristics to the side signal S1, the main signal MX, and the side signal S2, respectively.

An adder 29 adds the side signal S1 to the side signal S2 output from the FIR filter 26 and the FIR filter 28. Then, the adder 29 outputs a signal obtained by the addition.

A multiplier 30 multiplies the signal output from the adder 29 by a constant $\alpha$ and outputs a signal CT obtained by the multiplication.

Next, a subtractor 31 subtracts the signal CT from the main signal MX output from the FIR filter 27. The result of the subtraction is referred to as an output mz.

If the impulse response of the FIR filter 27 is indicated by psf1(x), and the impulse responses of the FIR filters 26 and 28 are collectively indicated by psf2(x), the output mz output from the subtractor 31 is given by Equation (4) below:

$$mz = MX(x)*psf1(x) - \alpha\{S1(x) + S2(x)\}*psf2(x). \qquad (4)$$

Thus, the side signals S1 and S2 output from the FIR filters 26 and 28 are added together by the adder 29 and produce a signal corresponding to the effect generated from the two adjacent tracks. Therefore, the signal output from the adder 29 becomes nearly equal to the crosstalk components from the two adjacent tracks.

Further, the output CT from the multiplier 30 corresponds to the crosstalk components to be removed. Then, the subtractor 31 subtracts the output CT from the main signal MX which was filtered by the FIR filter 27 so that the crosstalk components are cancelled from the main signal MX. Subsequently, the subtractor 31 outputs the signal mz.

The adjacent-track interference-removing circuit 10 is further provided with cross-modulation calculators 33 and 34.

By using the input main signal MX and side signal S1, the cross-modulation calculator 33 generates and outputs a cross-modulation signal CM1, which is an estimated value of the cross modulation from one of the adjacent tracks. Similarly, by using the input main signal MX and side signal S2, the cross-modulation calculator 34 generates and outputs a cross-modulation signal CM2, which is an estimated value of the cross-modulation from the other adjacent track.

The configuration of the cross-modulation calculator 33 is the same as that of the cross-modulation calculator 34. Therefore, only the configuration of the cross-modulation calculator 33 will be described with reference to FIGS. 3 and 4.

Figure 3:
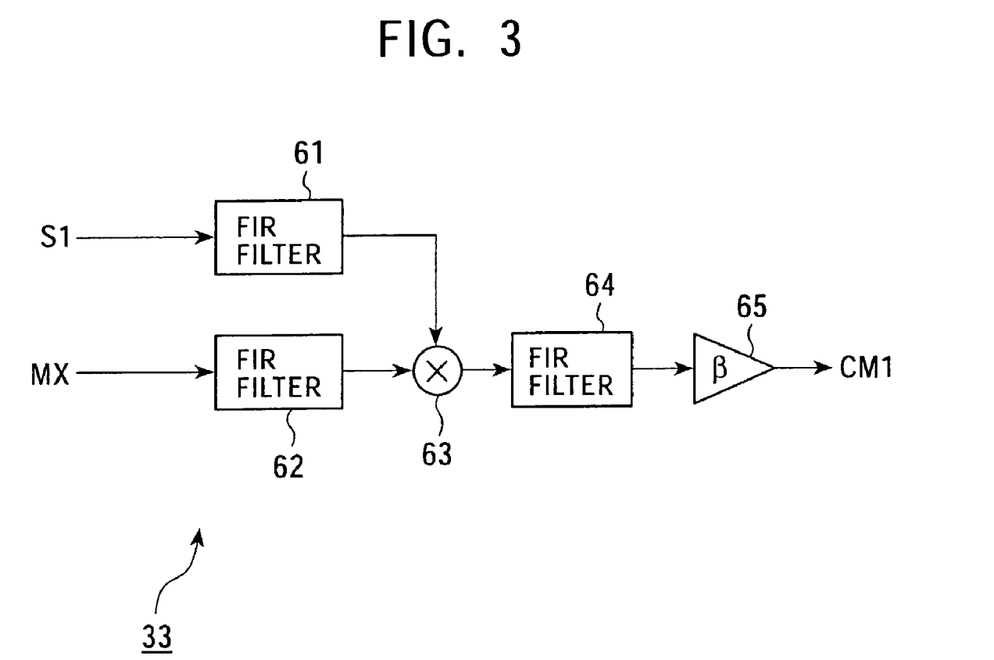
FIG. 3 is a block diagram illustrating the configuration of a cross-modulation calculator according to the embodiment of the present invention.

As shown in FIG. 3, the cross-modulation calculator 33 includes FIR filters 61, 62, and 64, and multipliers 63 and 65.

The FIR filter 61 convolutes and integrates the impulse response psf3(x) for the side signal S1 and outputs the result.

Similarly, the FIR filter 62 convolutes and integrates the impulse response psf4(x) for the main signal MX and outputs the result.

The adder 63 multiplies the output from the FIR filter 61 by the output from the FIR filter 62 and outputs the result.

The FIR filter 64 is an RF-cut filter for removing extremely-high frequency components from the output from the adder 63. The FIR filter 64 removes frequency components higher than the cut-off frequency of the optical pickup 17 from the signal output from the multiplier 63.

The multiplier 65 multiplies the output from the FIR filter 64 by a constant $\beta$ and outputs the result.

Thus, the FIR filter 64 performs low-pass-filter calculation and the multiplier 65 multiplies the output from the FIR filter 64 by the constant $\beta$, which corresponds to the cross-modulation. That is to say, the FIR filter 64 and the multiplier 65 calculate the estimated value of the cross-modulation by using the output from the multiplier 63.

In the case where the characteristic of the FIR filter 64 is ignored, the cross-modulation signal CM1, which is calculated by the cross-modulation calculator 33, can be shown as in the following equation:

$$CM1 = \beta \cdot \{S1(x) * psf3(x)\} \{MX(x) * psf4(x)\}. \quad (5)$$

The configuration of the cross-modulation calculator 34 is the same as that of the cross-modulation calculator 33. Upon receiving the side signal S2 and the main signal MX, the cross-modulation calculator 34 generates and outputs the cross-modulation signal CM2 as given by the following equation:

$$CM2 = \beta \cdot \{S2(x) * psf3(x)\} \{MX(x) * psf4(x)\}. \quad (6)$$

The subtractor 32 shown in FIG. 2 subtracts the cross-modulation signals CM1 and CM2 from the output mz of the subtractor 31. Then, the subtractor 32 outputs the result obtained by the subtraction as a corrected signal HX.

The corrected signal HX can be described as in the following equation:

$$HX = MX(x) * psf1(x) - \alpha\{S1(x) + S2(x)\} * psf2(x) - \beta \cdot \{S1(x) * psf3(x)\}\{MX(x) * psf4(x)\} - \beta \cdot \{S2(x) * psf3(x)\}\{MX(x) * psf4(x)\}. \quad (7)$$

If Equation (7) is compared to Equation (3), it becomes clear that the crosstalk components and the cross-modulation components calculated according to Equation (7) are more correct than that calculated according to Equation (3).

Thus, according to Equation (7), the crosstalk components indicated by the term multiplied by constant $\alpha$ is subtracted from the filtered main signal MX indicated by MX(x)*psf1(x). Further, the cross-modulation components indicated by the terms multiplied by constant $\beta$ are subtracted from the filtered main signal MX indicated by MX(x)*psf1(x). In this manner, the crosstalk components and the cross-modulation components are cancelled.

Accordingly, the corrected signal HX is output from the adjacent-track interference-removing circuit 10 as a signal whose crosstalk components and cross-modulation components have been properly removed. Then, the corrected signal HX is transmitted to the PRML decoder 13 shown in FIG. 1. The PRML decoder 13 performs maximum-likelihood decoding for the corrected signal HX. Since the crosstalk components and the cross-modulation components have been properly removed from the corrected signal HX, it becomes possible to reproduce information with high error tolerance, for example, in the case where the quality of reproduction signals is deteriorated due to dirt or distortion in a recording medium such as an optical disk or the like.

Figure 4:
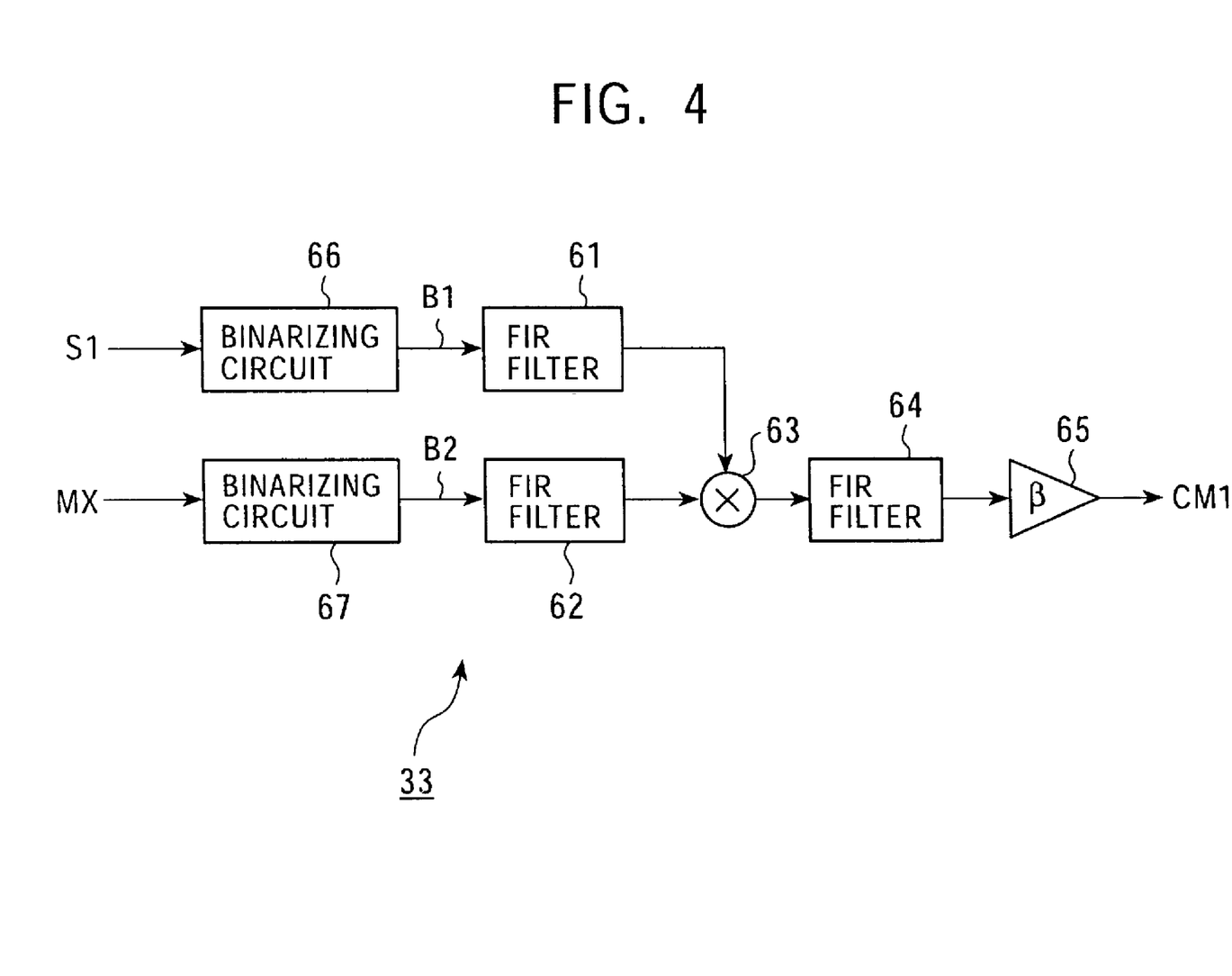
FIG. 4 is block diagram illustrating the configuration of another cross-modulation calculator according to another embodiment of the present invention.

FIG. 4 illustrates another configuration of the cross-modulation calculator 33 which is provided for obtaining the cross-modulation signal CM1.

In this case, the cross-modulation calculator 33 further includes binarizing circuits 66 and 67 at the input stage thereof.

The binarizing circuit 66 compares the side signal S1 with a predetermined threshold level and converts it into a binary signal B1. Then, the binary signal B1 is input to the FIR filter 61.

The binarizing circuit 67 compares the main signal MX with another predetermined threshold level and converts it into a binary signal B2. Then, the binary signal B2 is input to the FIR filter 62.

As in the case of FIG. 3, the binary signals B1 and B2 are processed by the FIR filters 61 and 62, the calculator 63, the filter 64, and the calculator 65. Subsequently, the binary signals B1 and B2 are converted in to the cross-modulation signal CM1.

The information stored on the disk 2 is formed as binary data formed by pits and spaces. According to the configuration shown in FIG. 4, the side signal S1 and the main signal MX are binarized by the binarizing circuit 66 and the binarizing circuit 67, respectively, before being filtered. Subsequently, the signal CM1 output from the cross-modulation calculator 33 in FIG. 4 corresponds to the information stored on the optical disk 2.

Therefore, it is better to reproduce the signal CM1 obtained by the cross-modulation calculator 33 in the case of FIG. 4 than that obtained by the cross-modulation calculator 33 in the case of FIG. 3.

The cross-modulation calculator 34 can also be configured as in the case of the cross-modulation calculator 33 in FIG. 4.

As has been described, the reproducing device of the present invention can cancel not only crosstalk components but also cross-modulation components. Subsequently, the obtained corrected signals are corrected more effectively than in the cases where the known crosstalk correction circuits are used. Consequently, the reproducing device of the present invention can reproduce data stored on an optical disk more stably than in the past.

As has been described, the present invention can be applied to a device for reproducing CDs and DVDs and to a method for removing noise therefor. However, the present invention can also be applied to a reproducing device used for various kinds of optical disks and optical recording media, such as an optical card media, an optical tape medium, and so forth, and to a noise-removal method used for the various kinds of optical disks and the optical recording media. That is to say, the present invention can be used for a device suffering from crosstalk and cross-modulation caused by an adjacent track.

What is claimed is:

1. A reproducing device that irradiates a track of a recording medium with laser light and reproduces data stored on the track by using the light reflected from the track, the reproducing device comprising:

signal-reading means for outputting at least one first read signal from at least one track adjacent to a main track and a second read signal from the main track for reproduction and;

first filtering means for filtering the first read signal from the adjacent track;

second filtering means for filtering the second read signal from the main track;

multiplication means for multiplying an output from the first filtering means by an output from the second filtering means;

estimated-value calculation means for calculating an estimated value of cross-modulation on the main track by using an output from the multiplication means; and cross-modulation removal means for removing a cross-modulation component caused by the adjacent track from the second read signal by subtracting the estimated cross-modulation value from the second read signal.

2. A reproducing device according to claim 1, further comprising:

third filtering means for filtering the first read signal; and crosstalk-removal means for removing a crosstalk component caused by the adjacent track from the second read signal by subtracting an output from the third filtering means from the second read signal.

3. A reproducing device according to claim 1, wherein the estimated-value calculation means comprises:

fourth filtering means that performs a calculation for removing an RF component from the output from the multiplication means; and constant-multiplication means for multiplying the output from the fourth filtering means by a constant corresponding to the magnitude of the cross modulation.

4. A reproducing device according to claim 1, wherein the first filtering means comprises a first FIR filter and a first binarizing unit for binarizing the first read signal, and wherein the second filtering means comprises a second FIR filter and a second binarizing unit for binarizing the second read signal.

5. A method of removing noise caused by at least one track adjacent to a main track on a recording medium for reproducing data stored on the main track, the method comprising the steps of:

filtering a first read signal from the adjacent track;

filtering a second read signal from the main track;

calculating an estimated value of cross-modulation by multiplying the filtered first read signal by the filtered second read signal;

calculating an estimated value of crosstalk caused by the adjacent track by filtering the first read signal; and correcting the second read signal by using the estimated cross-modulation value and the estimated crosstalk value.

* * * * *